(12) United States Patent
Ohba

(10) Patent No.: US 12,355,310 B2
(45) Date of Patent: Jul. 8, 2025

(54) MOTOR

(71) Applicant: MINEBEA MITSUMI Inc., Nagano (JP)

(72) Inventor: Hirofumi Ohba, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 162 days.

(21) Appl. No.: 17/807,742

(22) Filed: Jun. 20, 2022

(65) Prior Publication Data

US 2022/0407391 A1 Dec. 22, 2022

(30) Foreign Application Priority Data

Jun. 21, 2021 (JP) ................. 2021-102262

(51) Int. Cl.
| | |
|---|---|
| *H02K 11/00* | (2016.01) |
| *H02K 5/14* | (2006.01) |
| *H02K 11/026* | (2016.01) |
| *H02K 11/215* | (2016.01) |

(52) U.S. Cl.
CPC ......... *H02K 11/026* (2013.01); *H02K 5/145* (2013.01); *H02K 11/215* (2016.01)

(58) Field of Classification Search
CPC .... H02K 11/026; H02K 5/145; H02K 11/215; H02K 5/14; H02K 5/04; H02K 5/24
See application file for complete search history.

(56) References Cited

U.S. PATENT DOCUMENTS

| | | | |
|---|---|---|---|
| 5,196,750 A | 3/1993 | Strobl | |
| 10,958,124 B2 | 3/2021 | Kuroda | |
| 2011/0140554 A1 | 6/2011 | Wong et al. | |
| 2017/0302131 A1* | 10/2017 | Kuroda | H02K 7/08 |

FOREIGN PATENT DOCUMENTS

| | | |
|---|---|---|
| JP | 05-041368 U | 6/1993 |
| JP | 2011-125215 A | 6/2011 |
| JP | 2012-253894 A | 12/2012 |
| JP | 2017-192269 A | 10/2017 |
| JP | 2019-187236 A | 10/2019 |

OTHER PUBLICATIONS

Notice of Reasons for Refusal dated Oct. 2, 2024 for corresponding Japanese Application No. 2021-102262 and English translation.

* cited by examiner

*Primary Examiner* — Thomas Truong
(74) *Attorney, Agent, or Firm* — Chrisman Gallo Tochtrop LLC

(57) ABSTRACT

A motor includes a frame, a bracket, a brush, a cover, and an electronic component. The bracket includes a first portion accommodated in the frame and a second portion protruding from the first portion toward the cover. The second portion is accommodated in the cover. The brush is disposed at the first portion of the bracket. The electronic component is disposed at the second portion of the bracket.

15 Claims, 13 Drawing Sheets

AXIAL DIRECTUION → SECOND DIRECTUION
↓
FIRST DIRECTUION

FIRST DIRECTUION
↑
SECOND DIRECTUION ← ⊙ AXIAL DIRECTUION

MOTOR

CROSS-REFERENCE TO RELATED APPLICATIONS

This application claims the benefit of Japanese Application No. 2021-102262, filed Jun. 21, 2021, the entire disclosure of which is hereby incorporated herein by reference.

TECHNICAL FIELD

The present invention relates to a motor.

BACKGROUND ART

In a rotating electrical machine such as a motor, it is known that an electronic component such as a choke coil or a PTC thermistor is mounted in the rotating electrical machine for electromagnetic compatibility (EMC) measures.

CITATION LIST

Patent Literature

Patent Document 1: JP H05-41368 A
Patent Document 2: JP 2011-125215 A

SUMMARY OF INVENTION

Technical Problem

However, in order to protect the electronic component from vibration of the motor or the like, a large space needs to be ensured, and thus reduction in size of the motor may be hindered.

An object of one aspect is to provide a motor capable of achieving reduction in size.

Solution to Problem

In one aspect, a motor includes a frame, a bracket, a brush, a cover, and an electronic component. The bracket includes a first portion accommodated in the frame and a second portion protruding from the first portion toward the cover. The second portion is accommodated in the cover. The brush is disposed at the first portion of the bracket. The electronic component is disposed at the second portion of the bracket.

With the one aspect, it is possible to achieve the reduction in size.

DESCRIPTION OF EMBODIMENTS

Figure 1:
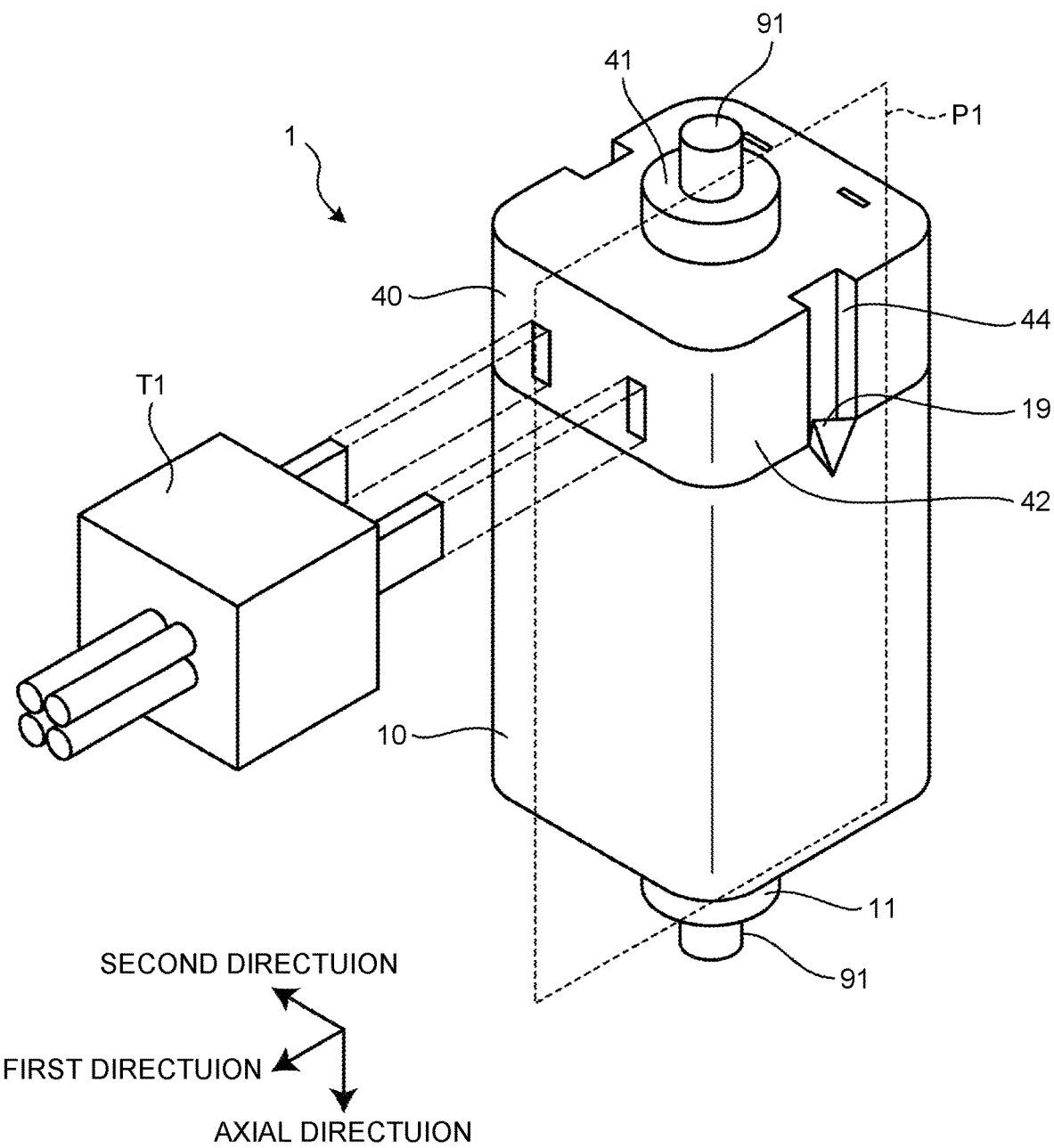
FIG. 1 is a perspective view illustrating one example of a motor according to a first embodiment.

An embodiment of a motor disclosed in the present application will be described below in detail with reference to the drawings. Note that the dimensional relationships, the proportions, and the like between elements in the drawings may differ from those in reality. Among the drawings, portions having mutually different dimensional relationships and proportions may be included. In each of the drawings, for ease of explanation, a coordinate system may be illustrated, the coordinate system having a direction, as an axial direction, in which a shaft 91 described below extends and directions, as a first direction and a second direction, respectively, in which side walls 22 of a bracket 20 are formed. More specifically, a direction in which the shaft 91 protrudes with respect to a frame 10 is denoted as a positive direction side in the axial direction, and in the bracket 20, a side of the first direction at which a terminal placement portion 23 is formed is denoted as a positive direction side in the first direction, and a side of the second direction at which a PTC 36 is disposed is denoted as a positive direction side.

First Embodiment

Figure 2:
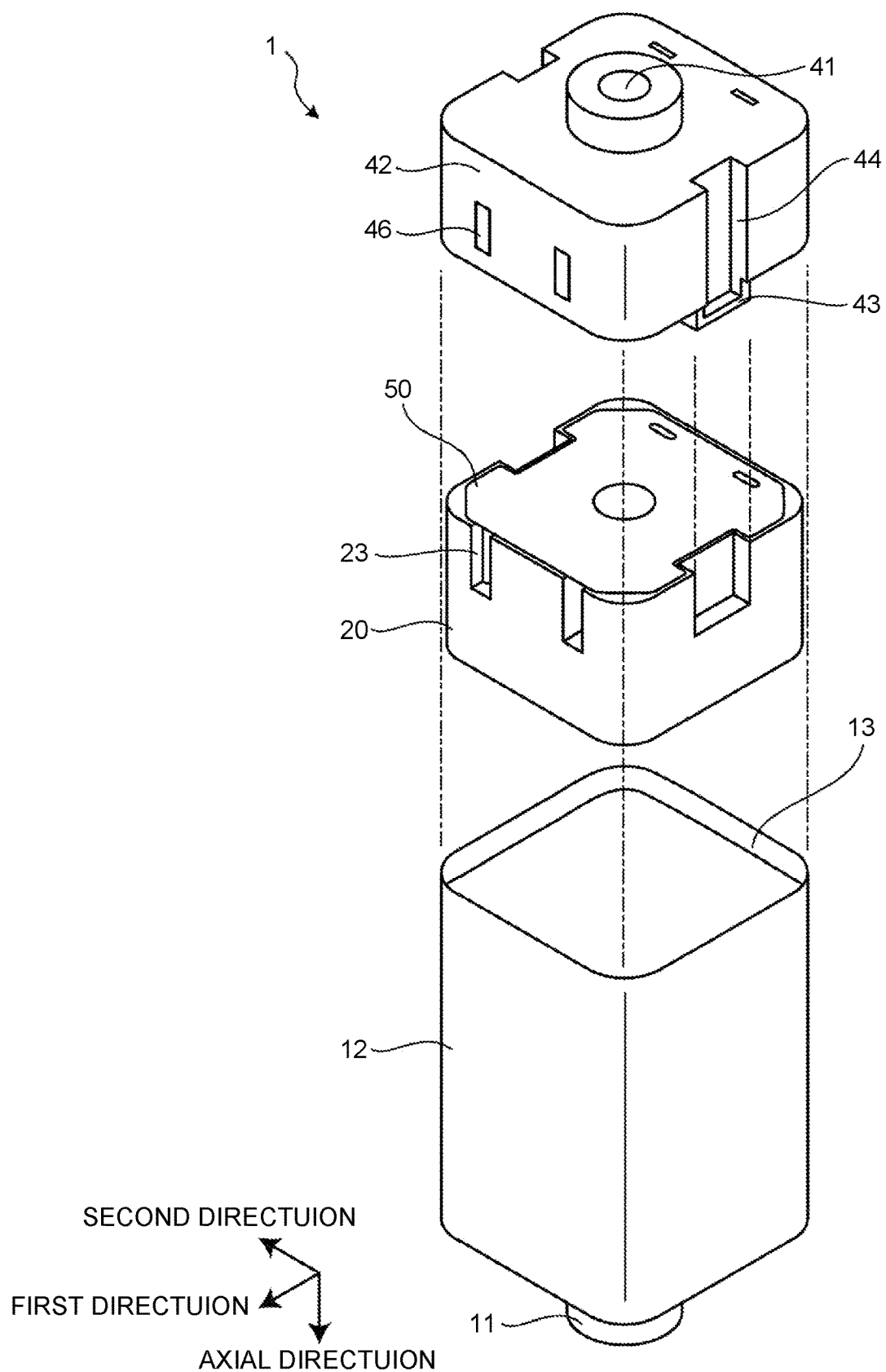
FIG. 2 is an exploded perspective view illustrating one example of the motor according to the first embodiment.
Figure 3:
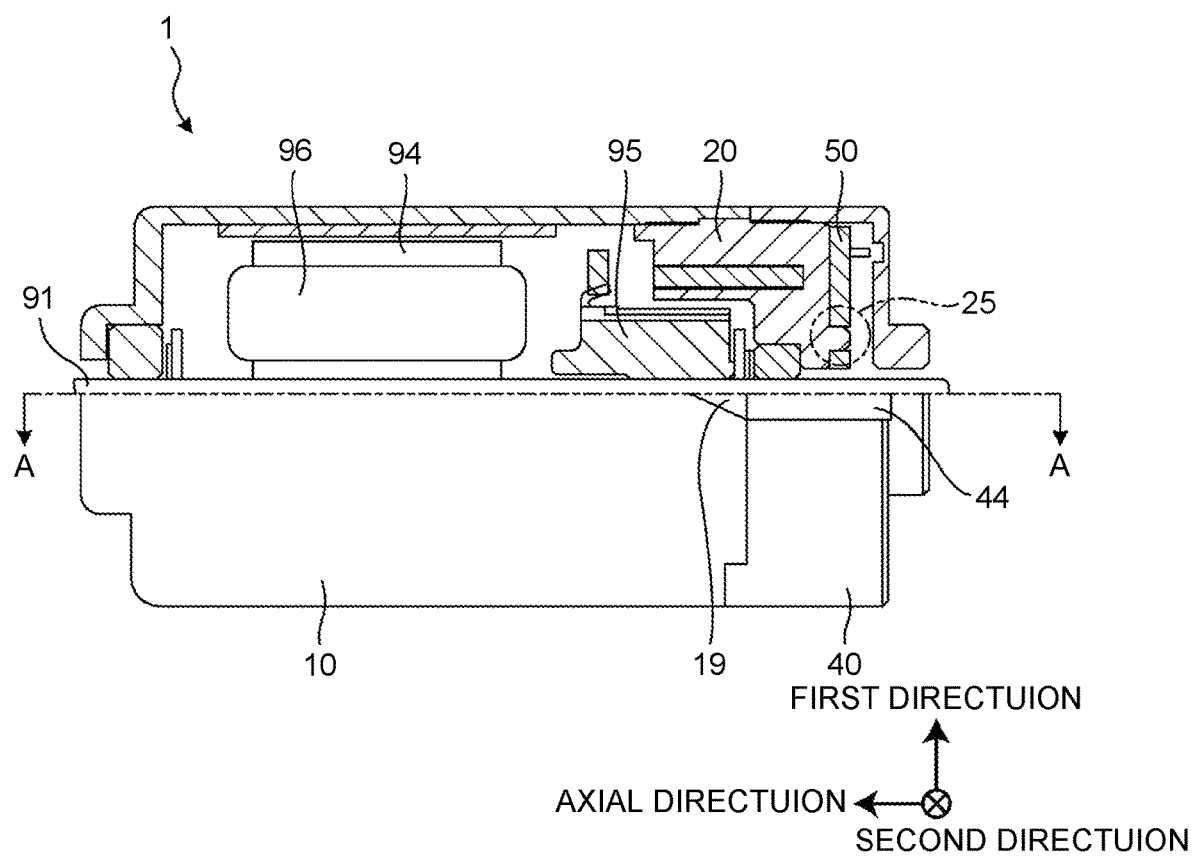
FIG. 3 is a partial cross-sectional view illustrating one example of the motor according to the first embodiment.
Figure 4:
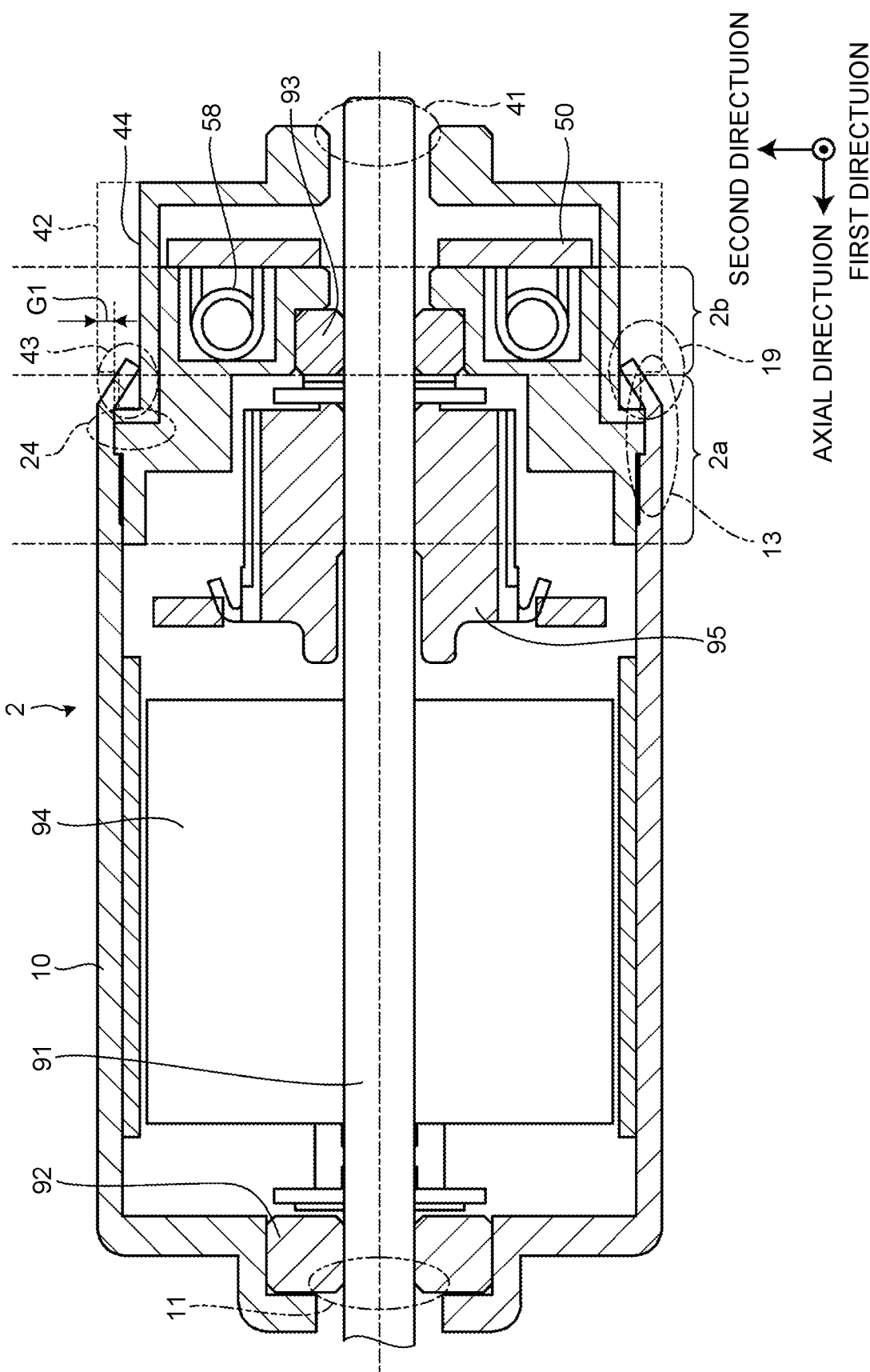
FIG. 4 is a side cross-sectional view illustrating one example of the motor according to the first embodiment.

First, a motor according to a present embodiment will be described. FIG. 1 is a perspective view illustrating one example of a motor according to a first embodiment. FIG. 2 is an exploded perspective view illustrating one example of the motor according to the first embodiment. FIG. 3 is a partial cross-sectional view illustrating one example of the motor according to the first embodiment. FIG. 4 is a side cross-sectional view illustrating one example of the motor according to the first embodiment. FIG. 3 illustrates a partial cross section taken along plane P1 illustrated in FIG. 1. FIG. 4 illustrates a cross section taken along line A-A in FIG. 3.

As illustrated in FIGS. 1 and 2, a motor 1 according to the present embodiment includes a frame 10, a bracket 20, a substrate 50, a cover 40, and a shaft 91. The shaft 91 is inserted to a through hole 11 of the frame 10 and a through hole 41 of the cover 40. Note that in FIG. 2, the shaft 91 is not illustrated.

In the first embodiment, the frame 10 is made of a plate of metal such as stainless steel, for example. The frame 10 includes the through hole 11, side walls 12, and an opening 13, as illustrated in FIG. 2.

The through hole 11 is formed at an end portion of the frame 10 at the positive direction side in the axial direction, and is inserted with the shaft 91 illustrated in FIG. 1. The opening 13 is formed at an end portion of the frame 10 at a negative direction side in the axial direction and is blocked by the bracket 20 illustrated in FIG. 2.

In addition, a cover 40 is engaged with the opening 13. In the first embodiment, the side walls 12 of the frame 10 at the opening 13 side (negative direction side in the axial direction) are formed to have a thickness (size in a radial direction) smaller than those of other portions, as illustrated in FIG. 2. In this case, a part of the side walls 12 at the opening 13 side forms a crimped portion 19 to be engaged with the cover 40, as illustrated in FIG. 1.

As illustrated in FIGS. 3 and 4, the frame 10 accommodates the shaft 91, an armature core 94, a commutator 95, and a coil 96. The shaft 91 is supported by the through hole 11 of the frame 10 via a bearing 92 at the positive direction side in the axial direction and supported by the bracket 20 via a bearing 93 at the negative direction side in the axial direction. The armature core 94 is a salient pole attached to the shaft 91 and protruding in the radial direction. The coil 96 is formed of a metal wire wound around the armature core 94. The armature core 94 wound around with the coil 96 rotates using the shaft 91 as the rotation shaft. The commutator 95 is attached to the shaft 91 and is connected to the coil 96. Note that in FIG. 4 and subsequent figures, the coil 96 may be omitted.

Figure 5:
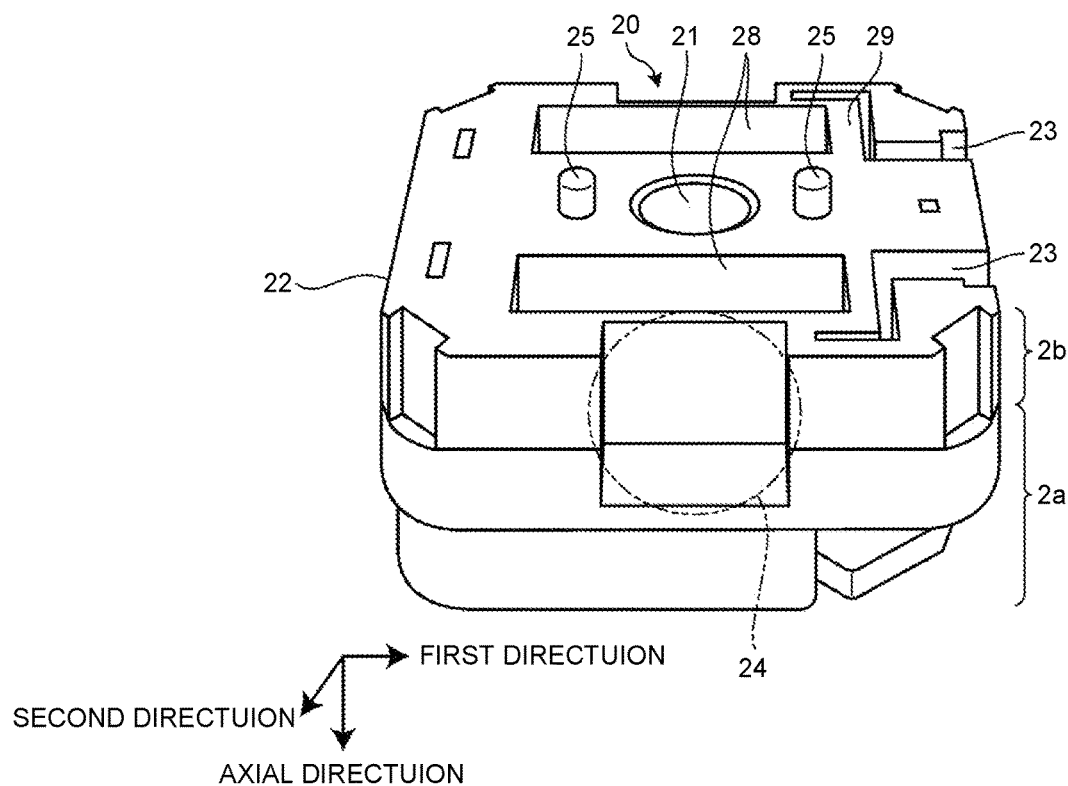
FIG. 5 is a perspective view illustrating one example of a bracket according to the first embodiment.
Figure 6:
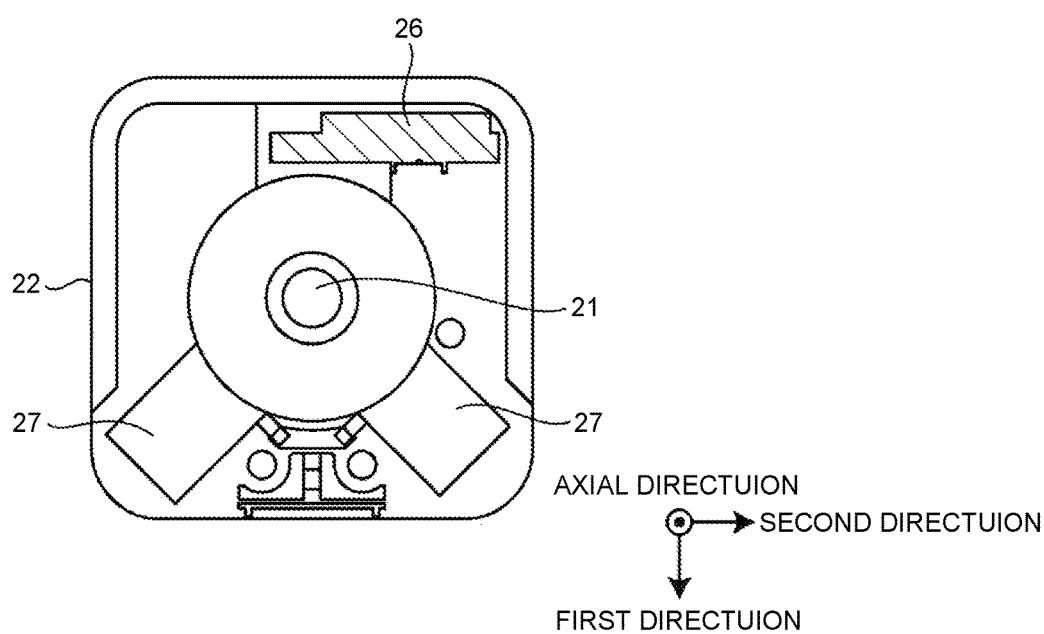
FIG. 6 is a front view illustrating one example of the bracket according to the first embodiment.

Various electronic components, terminals, and the like are mounted on the bracket 20. FIG. 5 is a perspective view illustrating one example of the bracket according to the first embodiment. FIG. 6 is a front view illustrating one example of the bracket according to the first embodiment. As illustrated in FIGS. 5 and 6, a through hole 21, the side walls 22, terminal placement portions 23, engaged recesses 24, substrate holding portions 25, a PTC accommodating portion 26, brush holders 27, and coil accommodating portions 28 are formed at the bracket 20. Note that the PTC accommodating portion 26 and the coil accommodating portions 28 are examples of an accommodating portion, and the engaged recesses 24 are an example of an engaged portion.

In the first embodiment, a dimension of the bracket 20 in the radial direction is formed to be somewhat smaller than dimensions of the inner side of the frame 10 and the inner side of the cover 40. In this case, a part of the bracket 20 in the axial direction is accommodated in the frame 10. On the other hand, a part of the bracket 20 at the cover 40 side, for example, at the negative direction side in the axial direction, is accommodated in the cover 40. In this case, as illustrated in FIG. 1, the bracket 20 is accommodated inside the frame 10 and the cover 40 and is not visible from the outside. In the following, a portion of the bracket 20 accommodated in the frame 10 is denoted as a first portion 2a, and a portion of the bracket 20 accommodated in the cover 40 is denoted as a second portion 2b in some cases.

In the first embodiment, as illustrated in FIGS. 5 and 6, the terminal placement portions 23, the substrate holding portions 25, and the coil accommodating portions 28 are formed at the second portion 2b, and the PTC accommodating portion 26 and the brush holders 27 are formed at the first portion 2a. Furthermore, the through hole 21 is formed so as to penetrate through the first portion 2a and the second portion 2b, and is inserted with the shaft 91. The engaged recesses 24 are formed in the side walls 22. In the first embodiment, the side walls 22 of the bracket 20 accommodated in the frame 10 and the cover 40 face, in the radial direction, either the side walls 12 of the frame 10 or side walls 42 of the cover 40 illustrated in FIG. 2.

In the first embodiment, the engaged recesses 24 each are formed, for example, in each of paired side walls 22 facing each other in the second direction, for example, at each of positions indicated by line A-A in FIG. 3. A part of each of the engaged recesses 24 is formed from the second portion 2b to the first portion 2a, as illustrated in FIG. 5. In other words, the engaged recesses 24 are formed in both the first portion 2a and the second portion 2b.

Figure 7:
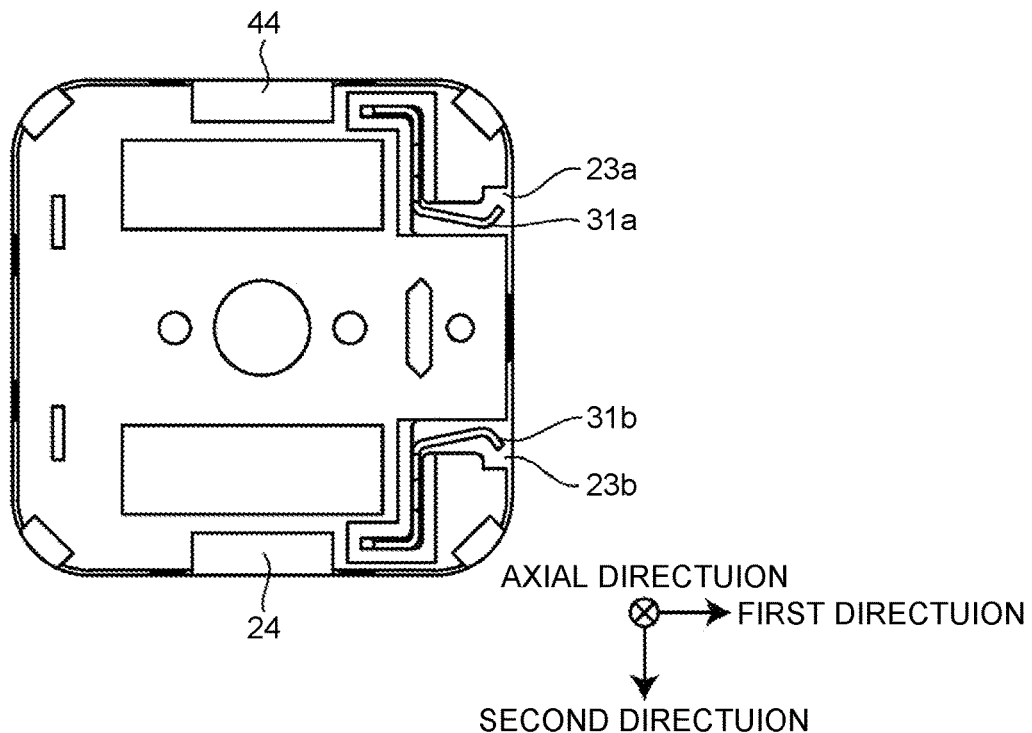
FIG. 7 is a back view illustrating one example of the bracket with a power supply terminal disposed according to the first embodiment.

The terminal placement portions 23 are formed in any one of the side walls 22 of the bracket 20, for example, at the positive direction side in the first direction. The terminal placement portions 23 have a pair of notches 23a and 23b formed, for example, from the side walls 22, in the radial direction (at the negative direction side in the first direction). A pair of power supply terminals 31a and 31b are disposed in the pair of notches 23a and 23b, respectively. FIG. 7 is a back view illustrating one example of the bracket with power supply terminals disposed according to the first embodiment. An external terminal T1, which is an external terminal of an external device illustrated in FIG. 1, is connected to the power supply terminals 31 illustrated in FIG. 7 via the notches 23a and 23b and openings 46 of the cover 40, which will be described below. Note that in the following, in a case where the power supply terminals 31a and 31b are expressed without distinction, they may simply be referred to as the "power supply terminal 31". The power supply terminal 31 is an example of a first terminal.

A substrate 50 is fixed to the substrate holding portions 25. The substrate holding portions 25 are, for example, a pair of protrusions. In the first embodiment, as illustrated in FIG. 2, the substrate 50 is disposed at the cover 40 side, that is, at the negative direction side in the axial direction with respect to the bracket 20.

The PTC accommodating portion 26 accommodates a PTC 36 and a PTC terminal 38, which will be described below. The brush holders 27 accommodate a pair of brushes 37. The coil accommodating portions 28 are, for example, a pair of recesses formed from an end surface of the bracket 20 at the negative direction side in the axial direction toward the positive direction side in the axial direction, and accommodate a pair of choke coils 58 mounted on the substrate 50. Note that the choke coils 58 are an example of an electronic component. Furthermore, flat plate terminals 32a and 32b described below are further mounted on the first portion 2a of the bracket 20. Note that in the following, in a case where the pair of brushes 37 are described distinctively, they may be denoted as brushes 37a and 37b, respectively. Similarly, in a case where the pair of choke coils 58 are described distinctively, they may be denoted as choke coils 58a and 58b, respectively. In addition, in the first embodiment, for allowing parts of the PTC terminal 38 and the flat plate terminals 32a and 32b to penetrate through the bracket 20 in the axial direction from the first portion 2a to the second portion 2b, a through hole other than the through hole 21 is formed in the bracket 20.

Figure 8:
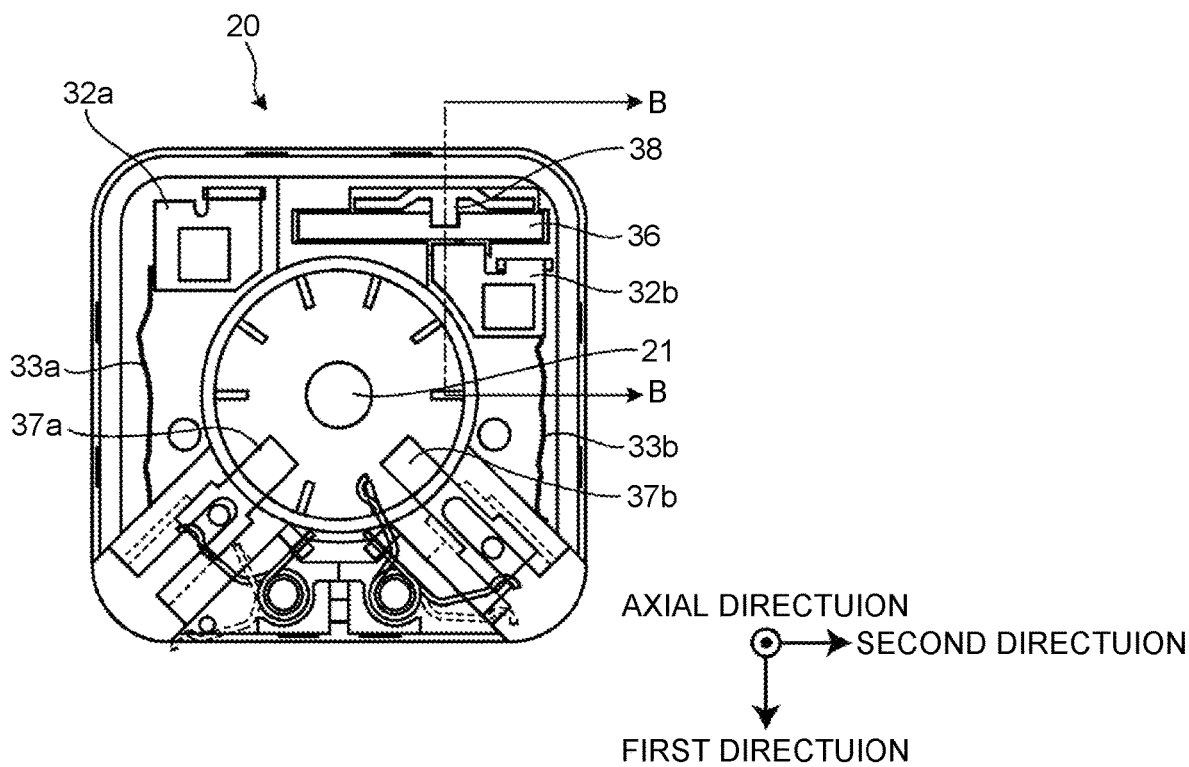
FIG. 8 is a front view illustrating one example of the bracket with an electronic component mounted according to the first embodiment.

Next, an electronic component and the like mounted on the bracket 20 will be described with reference to FIGS. 8 to 12. FIG. 8 is a front view illustrating one example of the bracket with an electronic component mounted according to the first embodiment.

Figure 9:
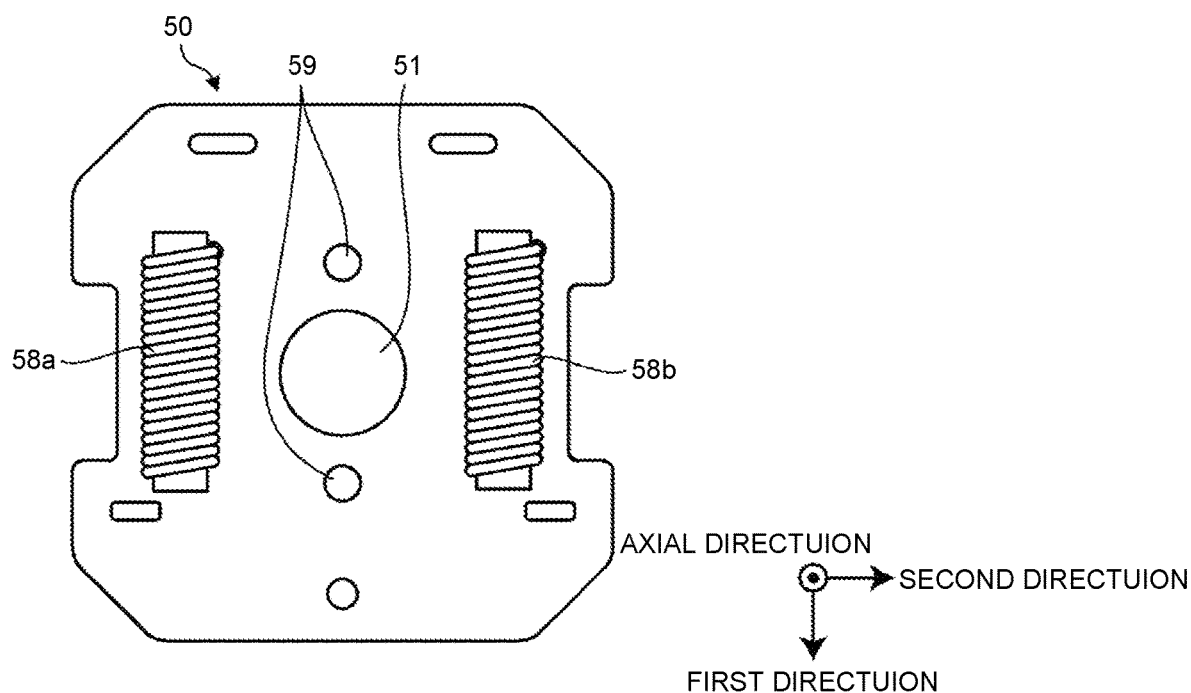
FIG. 9 is a front view illustrating one example of a substrate according to the first embodiment.
Figure 10:
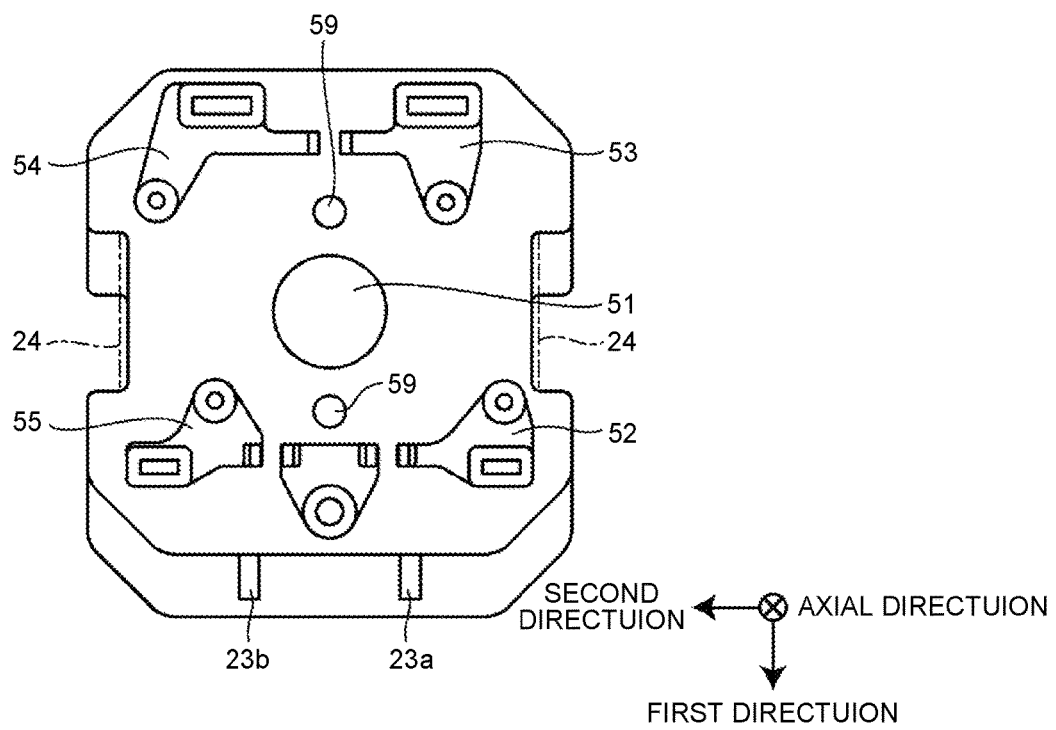
FIG. 10 is a back view illustrating one example of the bracket with the substrate mounted according to the first embodiment.

The power supply terminal 31 supplies power from the external terminal T1 to various electronic components and the like mounted on the bracket 20. For example, the power supply terminal 31a is connected to the choke coil 58a via the substrate 50 illustrated in FIG. 9. FIG. 9 is a front view illustrating one example of the substrate according to the first embodiment. FIG. 10 is a back view illustrating one example of the bracket with the substrate mounted according to the first embodiment. As illustrated in FIGS. 9 and 10, the substrate 50 includes a through hole 51, patterns 52 to 55, the pair of choke coils 58, and engaged portions 59. The shaft 91 is inserted to the through hole 51. The engaged portions 59 are engaged with the substrate holding portions 25 of the bracket 20. The engaged portions 59 are, for example, a pair of through holes, but this is not a limitation, and they may be recesses or the like. Furthermore, as illustrated in FIG. 10, notches may be formed in the substrate 50 in accordance with a shape of the engaged recesses 24 of the bracket 20.

In the first embodiment, the pair of choke coils 58 reduces noise having a specific frequency, for example, as an inductor. The pair of choke coils 58 is fixed to the substrate 50 at the positive direction side in the axial direction by, for example, soldering, and is connected to a terminal, an electronic component, and the like mounted on the bracket 20 via the patterns 52 to 55. In the first embodiment, the choke coil 58a connected to the power supply terminal 31a via the pattern 52 is connected to the flat plate terminal 32a via the pattern 53. Note that the choke coils 58 need only be a component for electromagnetic compatibility (EMC) measures that reduces noise having a specific frequency, and, for example, other electronic components such as a capacitor or an inductor may be used.

In the first embodiment, the pair of choke coils 58 protrudes from the substrate 50 to the positive direction side in the axial direction and is accommodated in the coil accommodating portions 28 of the bracket 20. In other words, as illustrated in FIG. 4, the pair of choke coils 58 is located at the positive direction side in the axial direction with respect to an end portion of the bracket 20 at the negative direction side in the axial direction. In addition, as illustrated in FIG. 5, the coil accommodating portions 28 accommodating the pair of choke coils 58 are formed at positions overlapping with the terminal placement portions 23 in the radial direction. In other words, the pair of choke coils 58 is arranged side by side in the radial direction with the pair of power supply terminals 31. Furthermore, the choke coils 58 face the pair of power supply terminals 31 in the radial direction via a partition wall 29 in the bracket 20. According to such a configuration, it is possible to reduce a size of the motor 1 in the axial direction.

The flat plate terminal 32a illustrated in FIG. 8 electrically connects the choke coil 58a and the brush 37a mounted on the brush holder 27 via a pigtail 33a. The brushes 37a and 37b are disposed in such a manner that their tips come into contact with the commutator 95. Power is supplied to the commutator 95 via the brushes 37a and 37b, so that the motor 1 rotates.

The brush 37b is connected to the PTC 36 via the pigtail 33b and the flat plate terminal 32b. The PTC 36 in the first embodiment is an electronic component that changes electrical resistance in response to a change in temperature. Note that PTC 36 is an example of a second electronic component.

In the first embodiment, the PTC 36 and the PTC terminal 38 are accommodated in the PTC accommodating portion 26 of the bracket 20. In this case, the PTC terminal 38 is accommodated in such a manner that a part of the PTC terminal 38 supports the PTC 36 from the positive direction side in the axial direction. Note that the PTC terminal 38 is an example of a second terminal.

Figure 11:
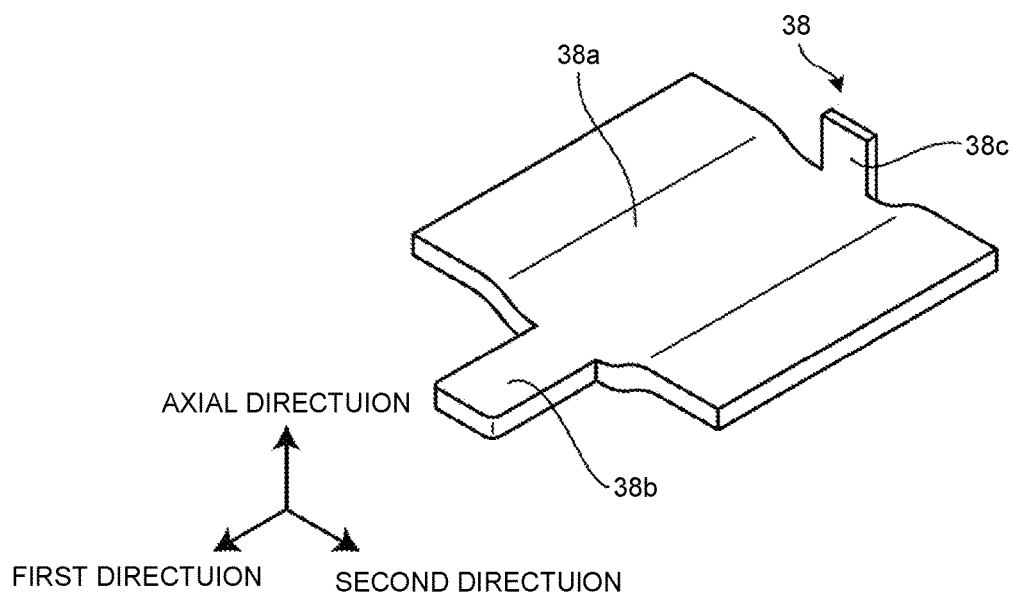
FIG. 11 is a perspective view illustrating one example of a PTC terminal according to the first embodiment.
Figure 12:
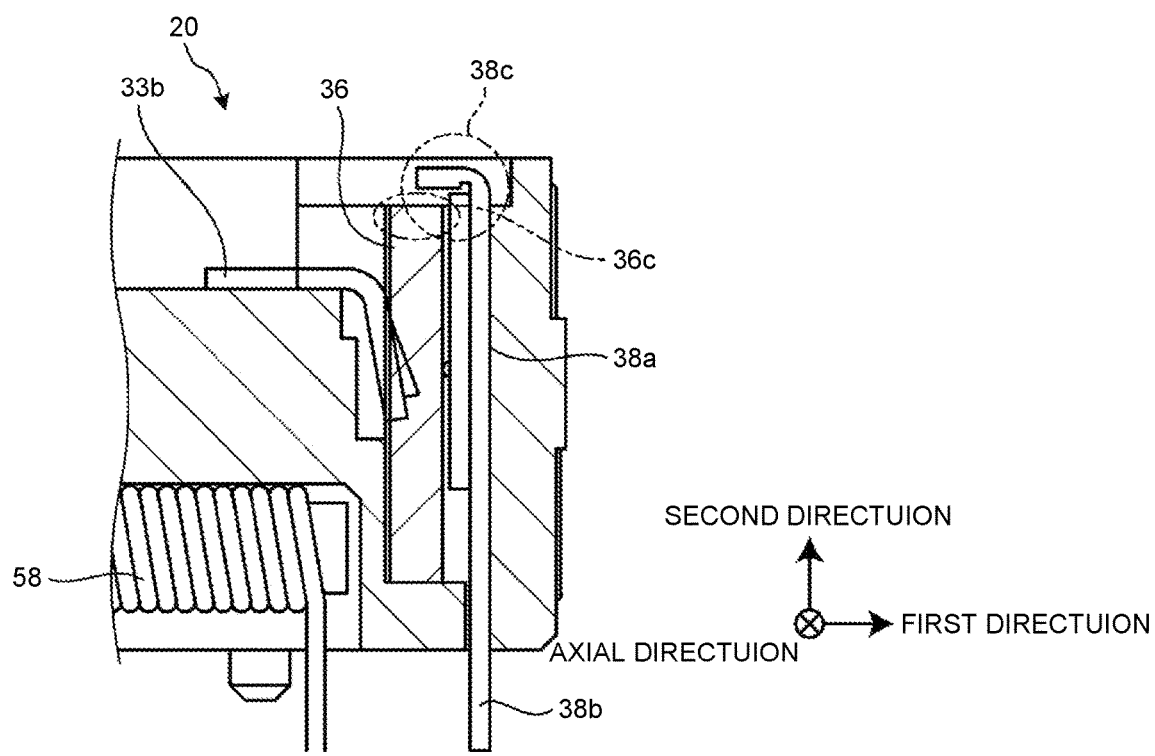
FIG. 12 is an enlarged cross-sectional view illustrating one example of the bracket according to the first embodiment.

FIG. 11 is a perspective view illustrating one example of the PTC terminal according to the first embodiment. FIG. 12 is an enlarged cross-sectional view illustrating one example of the bracket according to the first embodiment. FIG. 12 illustrates a cross section taken along the line B-B in FIG. 8. As illustrated in FIG. 11, the PTC terminal 38 includes a protruding portion 38c protruding toward the positive direction side in the axial direction, in addition to a main body 38a coming into contact with the PTC 36 and a connecting portion 38b penetrating through the second portion 2b to be connected to the substrate 50.

As illustrated in FIG. 12, when the PTC terminal 38 is accommodated in the PTC accommodating portion 26, the protruding portion 38c is disposed so as to face, in the axial direction, an end portion 36c of the PTC 36 at the positive direction side in the axial direction. The connecting portion 38b of the PTC terminal 38 is soldered to the substrate 50 to be fixed. With such a configuration, it is possible to suppress dropping of the PTC 36 due to vibration or the like of the motor 1. Note that although the protruding portion 38c and the end portion 36c of the PTC 36 at the positive direction side in the axial direction face each other with a gap to prevent the PTC 36 from moving when vibration or the like occurs, a configuration may be adopted in which the protruding portion 38c and the end portion 36c of the PTC 36 at the positive direction side in the axial direction are in contact with each other and the protruding portion 38c supports the end portion 36c of the PTC 36 at the positive direction side in the axial direction.

The PTC terminal 38 is connected to the choke coil 58b via the pattern 54 of the substrate 50. The choke coil 58b is connected to the power supply terminal 31b via the pattern 55 of the substrate 50.

Figure 13:
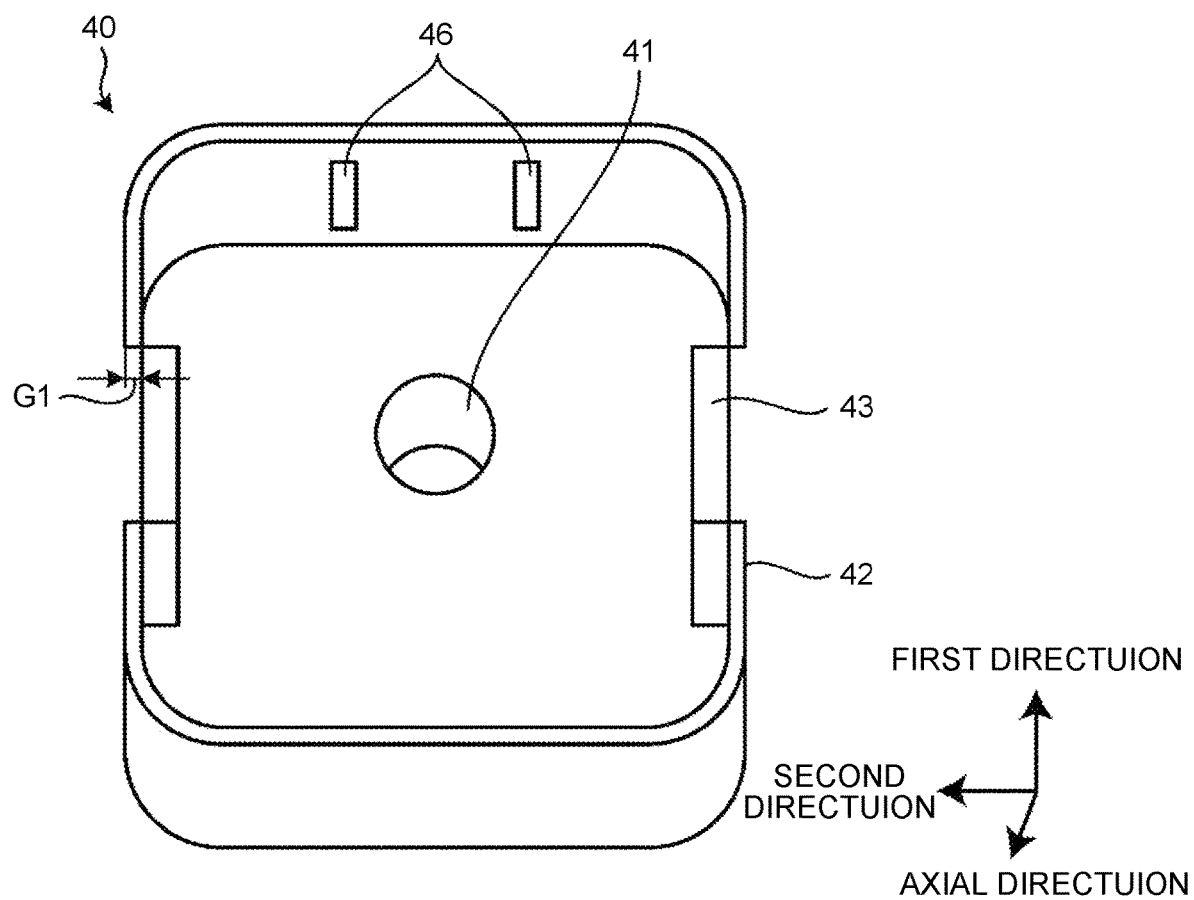
FIG. 13 is a perspective view illustrating one example of a cover according to the first embodiment.

In the first embodiment, the second portion 2b of the bracket 20 and the substrate 50 fixed to the second portion 2b are accommodated in the cover 40, as illustrated in FIG. 4. FIG. 13 is a perspective view illustrating one example of the cover according to the first embodiment. As illustrated in FIGS. 2 and 13, the cover 40 according to the first embodiment includes the through hole 41, the side walls 42, engaging protrusions 43, recesses 44, and openings 46. Note that the openings 46 are an example of a first opening, and the engaging protrusions 43 are an example of an engaging portion.

In the first embodiment, a dimension between opposing side walls 42 of the cover 40 is formed to be substantially the same as the dimension between the opposing side walls 12 of the frame 10. That is, the side walls 42 of the cover 40 are substantially flush with a portion of the side walls 12 of the frame 10 other than the crimped portion 19 illustrated in FIG. 1.

The through hole 41 is formed at an end portion of the cover 40 at the negative direction side in the axial direction, and is inserted with the shaft 91. The engaging protrusions 43 and the recesses 44 are formed in the side walls 42. In the first embodiment, the engaging protrusions 43 each are formed to protrude from each of the recesses 44 continuously to the positive direction side in the axial direction, as illustrated in FIGS. 2 and 4.

As illustrated in FIG. 4, the engaging protrusions 43 and the recesses 44 are formed at positions facing the engaged recesses 24 of the bracket 20 in the axial direction, that is, on line A-A in FIG. 3. In this case, in FIG. 4 illustrating a cross section taken along line A-A of FIG. 3, the side walls 42 are illustrated by a dashed line for convenience.

In such a configuration, the engaging protrusions 43 of the cover 40 and the engaged recesses 24 of the bracket 20 are engaged with each other, so that the bracket 20 and the cover 40 are engaged with each other. In this case, as illustrated in FIG. 2, the openings 46 of the cover 40 are formed at positions facing the terminal placement portions 23 of the bracket 20 in the radial direction. With such a configuration, the openings 46 serve as insertion openings for the external terminal T1 into the power supply terminals 31 disposed at the terminal placement portions 23.

Furthermore, as illustrated in FIGS. 13 and 4, an outer circumferential surface of each of the engaging protrusions 43 is formed radially inward by a width G1 with respect to the side walls 42 and the side walls 12 of the frame 10. That is, a dimension between the engaging protrusions 43 facing each other is smaller than a dimension between the side walls 42 facing each other. As a result, the engaging protrusions 43 are engaged with the opening 13 of the frame 10, as illustrated in FIG. 4. In this case, a part of the opening 13 in the frame 10 protrudes to the negative direction side in the axial direction with respect to the engaging protrusions 43 of the cover 40, as illustrated in FIG. 4. The protruding part of the opening 13 is crimped in the radial direction toward the recess 44 of the cover 40 to form the crimped portion 19. Note that the crimped portion 19 is an example of a part of the frame at the opening side.

As described above, the motor 1 in the first embodiment includes the frame 10, the bracket 20, the brushes 37, the cover 40, and the electronic component 58. The bracket 20 includes the first portion 2a accommodated in the frame 10 and the second portion 2b protruding from the first portion 2a toward the cover 40. The second portion 2b is accommodated in the cover 40. The brushes 37 are disposed at the first portion 2a of the bracket 20. The electronic component 58 is disposed at the second portion 2b of the bracket 20. With such a configuration, it is possible to achieve reduction in size of the motor 1.

In addition, in the first embodiment, the power supply terminals 31 connected to the external terminal T1 are encompassed by the cover 40 and the bracket 20. In this case, the power supply terminals 31 serve as a female terminal connected via the openings 46 of the cover 40 and the terminal placement portions 23 of the bracket 20. The external terminal T1, which is the male terminal, is inserted into the power supply terminals 31 from the outside in the radial direction. With such a configuration, it is possible to suppress the power supply terminals 31 of the motor 1 protruding to the outside of the cover 40.

Second Embodiment

A shape of the cover engaged with the frame 10 and the bracket 20 is not limited to that illustrated in the first embodiment, and another component such as an encoder may be accommodated in the cover. Note that, in the following modifications and embodiments, parts identical to those illustrated in the drawings described previously are designated by the same reference numerals, and duplicate description will be omitted. Note that an encoder of a second embodiment includes, for example, an encoder substrate 71, an encoder terminal 72, a rotation detection element 73, and an encoder magnet 97, which will be described below.

Figure 14:
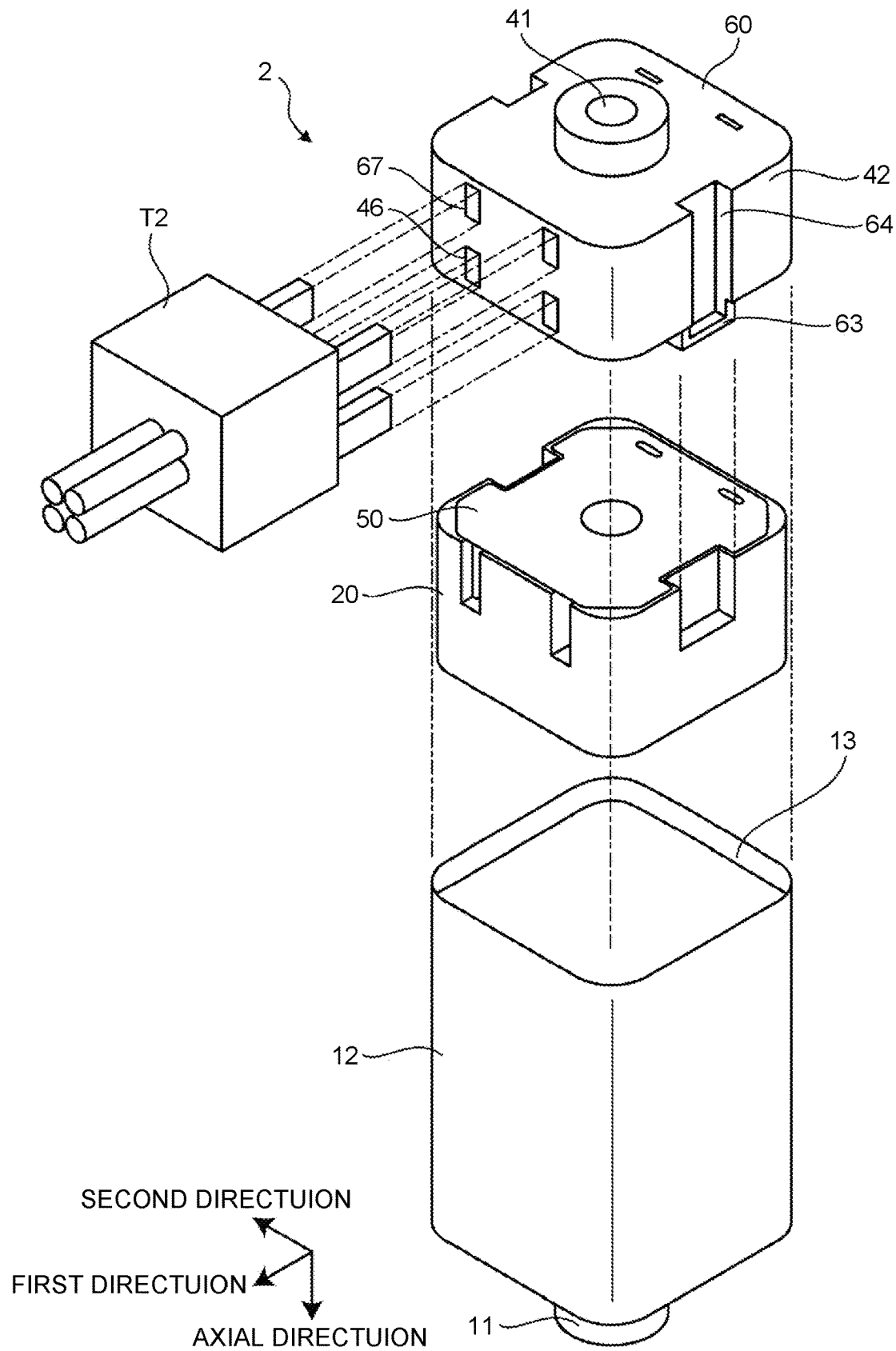
FIG. 14 is an exploded perspective view illustrating one example of a motor according to a second embodiment.
Figure 15:
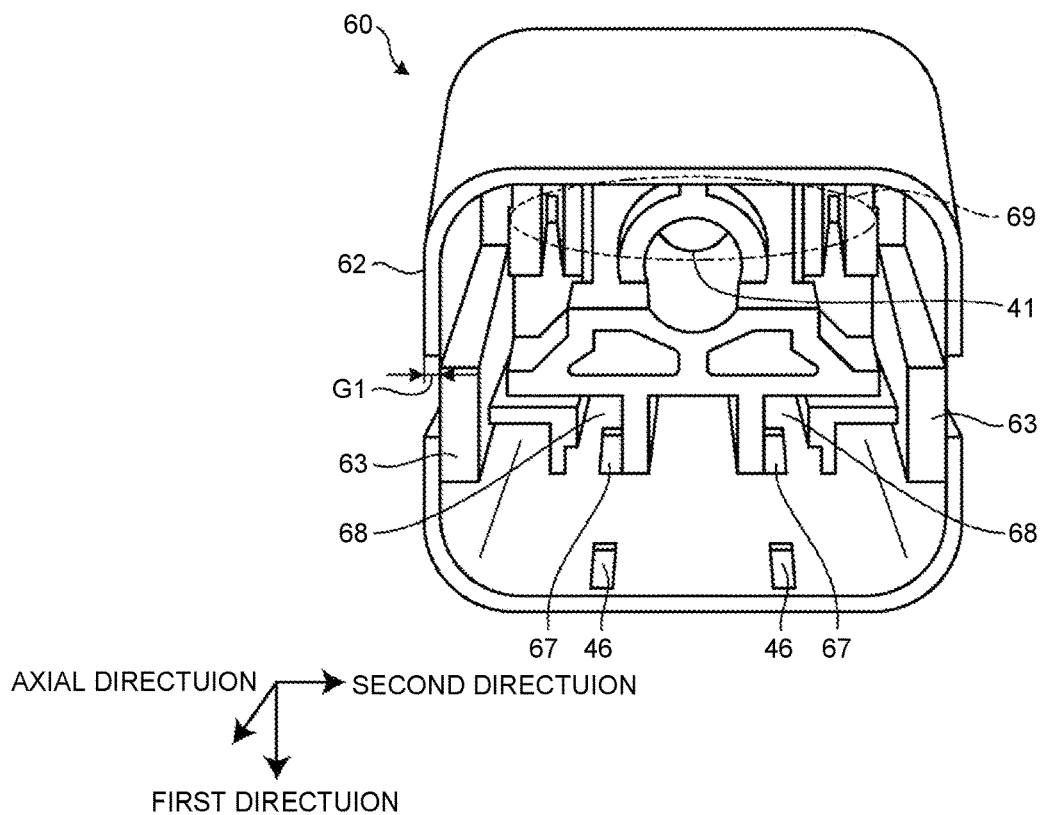
FIG. 15 is a perspective view illustrating one example of a cover according to the second embodiment.

A motor 2 in the second embodiment includes a frame 10, a bracket 20, a substrate 50, a shaft 91, and a cover 60, as illustrated in FIG. 14. FIG. 14 is an exploded perspective view illustrating one example of a motor according to the second embodiment. FIG. 15 is a perspective view illustrating one example of a cover according to the second embodiment. As illustrated in FIGS. 14 and 15, the cover 60 according to the second embodiment further includes openings 67, terminal placement portions 68, and an encoder substrate holding portion 69, in addition to a through hole 41, side walls 62, engaging protrusions 63, recesses 64, and openings 46. Note that the openings 67 are an example of a second opening.

The engaging protrusions 63 and the recesses 64 have shapes substantially the same as those of the engaging protrusions 43 and the recesses 44 in the first embodiment and are formed in substantially the same positions. This allows the cover 60 to be engaged with the frame 10 and the bracket 20, similarly to the cover 40.

Figure 16:
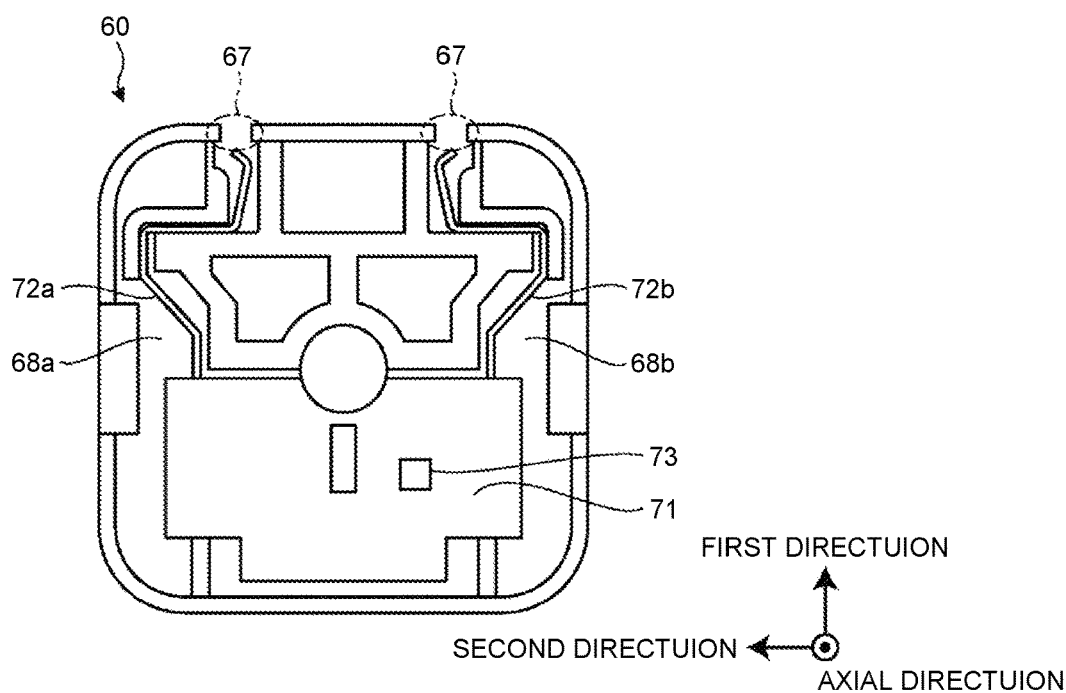
FIG. 16 is a front view illustrating one example of the cover with an encoder substrate mounted according to the second embodiment.

An encoder substrate 71 illustrated in FIG. 16 is mounted on the encoder substrate holding portion 69. FIG. 16 is a front view illustrating one example of the cover with the encoder substrate mounted according to the second embodiment. A rotation detection element 73 mounted on the encoder substrate 71 detects information about rotation of the shaft 91, such as a rotation angle or a rotation angle and a rotational speed of the shaft 91, using a magnetic flux of an encoder magnet 97. Note that as the rotation detection element 73, a known rotation detection element such as a Hall element or a Hall IC only needs to be used.

Figure 17:
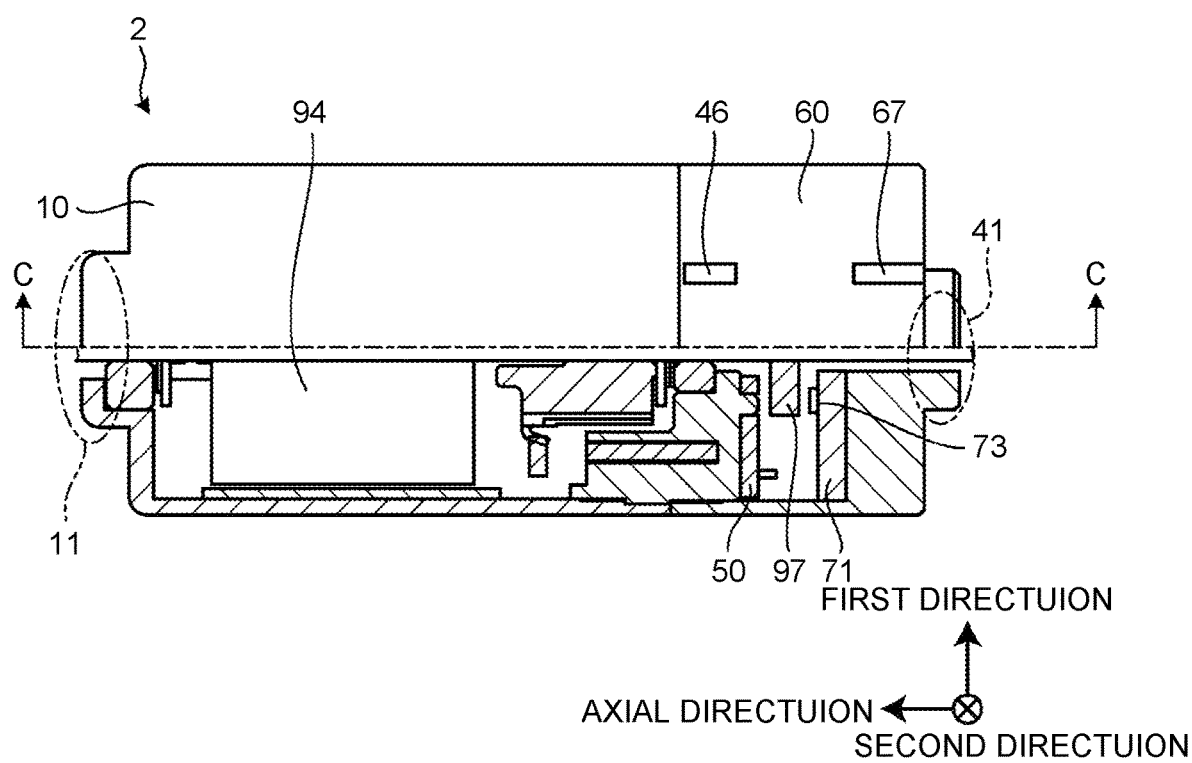
FIG. 17 is a partial cross-sectional view illustrating one example of the motor according to the second embodiment.
Figure 18:
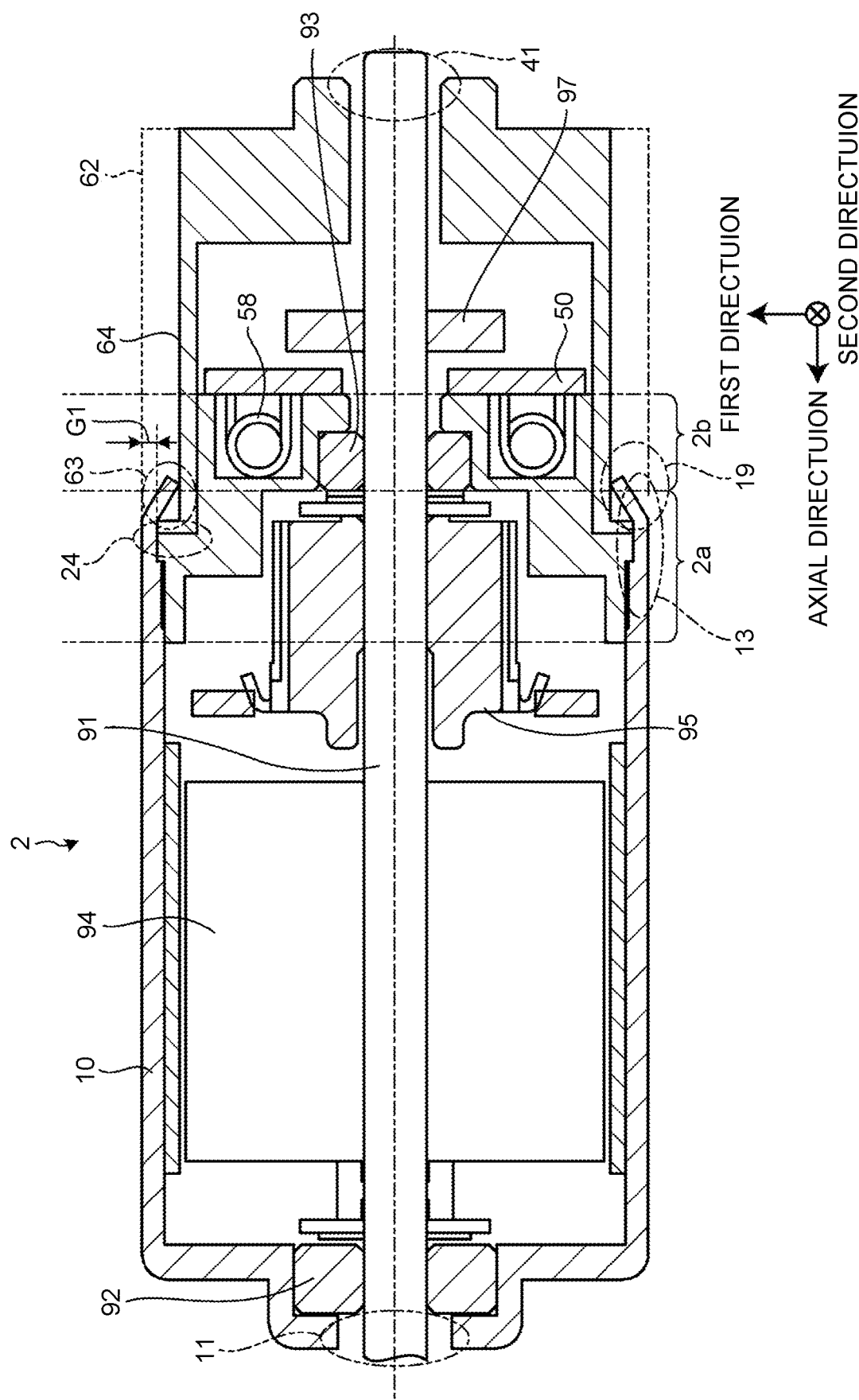
FIG. 18 is a side cross-sectional view illustrating one example of the motor according to the second embodiment.

In the second embodiment, the encoder magnet 97 is disposed at a position facing the rotation detection element 73 mounted on the encoder substrate 71 in the axial direction, as illustrated in FIG. 17. FIG. 17 is a partial cross-sectional view illustrating one example of the motor according to the second embodiment. FIG. 18 is a side cross-sectional view illustrating one example of the motor according to the second embodiment. FIG. 18 illustrates a cross section taken along the line C-C in FIG. 17. The encoder magnet 97 is disposed between the substrate 50 and the cover 60 in the axial direction. The encoder magnet 97 is attached to the shaft 91 and rotates in conjunction with the shaft 91. Note that in the cross-sectional view illustrated in FIG. 18, the rotation detection element 73 is not illustrated.

Encoder terminals 72 to be connected to the encoder substrate 71 are disposed at the terminal placement portions 68. As illustrated in FIG. 16, encoder terminals 72a, 72b disposed at the pair of terminal placement portions 68a, 68b extend to the openings 67, respectively. In this case, the encoder terminals 72 serve as a female terminal to be connected via the openings 67 of the cover 60. In such a configuration, as illustrated in FIG. 14, an external terminal T2, which is a male terminal, is connected to the encoder terminals 72 and the power supply terminals 31 from outside in the radial direction. Note that the external terminals T1 and T2 are examples of terminals of the external device. Furthermore, the external terminal T2 is connected to both the openings 46 and the openings 67, but different external terminals may be connected to the openings 46 and the openings 67, respectively.

As described above, the motor 2 in the second embodiment includes the cover 60. The encoder substrate 71 is provided inside the cover 60. The side walls 62 of the cover 60 include the openings 46 as the first opening and second openings 67 facing the encoder terminals 72 of the encoder substrate 71. With such a configuration, a component such as an encoder can be easily changed by changing the cover.

Note that the component accommodated in the cover 60 is not limited to an encoder, and may be another terminal or another electronic component.

Modifications

The configuration of each of the embodiments has been described above, but embodiments are not limited to those. For example, the motor is not limited to that illustrated in the embodiments, and may be a brushless motor or the like. In addition, the positions at which the engaged recesses 24 or the like are formed are not limited to those illustrated in the embodiments, and the engaged recesses 24 or the like can be formed at any positions as long as they are engageable with the cover 40 or 60. Furthermore, the electronic components accommodated in the motor according to the embodiments are not limited to the choke coils 58 and the PTC 36, and may be any electronic component such as another sensor or a communication device. In addition, the cross sections of the frame 10, the bracket 20, and the covers 40 and 60 may have another shape such as a substantially circular shape, in addition to the substantially rectangular shape illustrated in the embodiments.

The present invention has been described above based on the embodiments and the modifications, but the present invention is not limited to the embodiments and the modifications, and it goes without saying that various changes are possible without departing from the gist of the present invention. An embodiment with various changes within the scope not departing from such a gist is also included in the technical scope of the present invention, and this is obvious to those skilled in the art from the description of the claims.

REFERENCE SIGNS LIST 1, 2 Motor
10 Frame
11 Through hole
12 Side wall
13 Opening
19 Crimped portion
20 Bracket
21 Through hole
22 Side wall
23 Terminal placement portion
24 Engaged recess
25 Substrate holding portion
26 PTC accommodating portion
27 Brush holder
28 Coil accommodating portion
2a First portion
2b Second portion
31a, 31b Power supply terminal
32a, 32b Flat plate terminal
33a, 33b Pigtail
36 PTC
37a, 37b Brush
38 PTC terminal
40, 60 Cover
41 Through hole
42, 62 Side wall
43, 63 Engaging protrusion
44, 64 Recess
46, 67 Opening
68 Terminal placement portion
69 Encoder substrate holding portion
50 Substrate
51 Through hole
52 to 55 Pattern
58 Choke coil
59 Engaged portion
71 Encoder substrate
72 Encoder terminal
91 Shaft
92, 93 Bearing
94 Armature core
95 Commutator
96 Coil
97 Encoder magnet
T1, T2 External terminal

The invention claimed is:

1. A motor, comprising:
   a frame;
   a bracket;
   a bearing;
   a shaft supported by the bracket via the bearing;
   a brush;
   a cover; and
   a first electronic component, wherein
   the bracket comprises a first portion accommodated in the frame, a second portion protruding from the first portion toward the cover and a side wall formed continuously from the first portion to the second portion,
   the second portion is accommodated in the cover,
   the brush is disposed at the first portion of the bracket, and
   the first electronic component is accommodated at the second portion of the bracket,
   a first terminal is disposed at the second portion of the bracket,
   an opening is formed in a side wall of the cover facing a side wall of the bracket, the opening being open toward the first terminal, and
   the first terminal and the first electronic component are arranged side by side in the bracket in a radial direction,
   a substrate attached with the first electronic component, wherein
   the substrate is fixed to an end surface of the second portion in the cover side,
   the side wall of the cover comprises an engaging portion, and
   the side wall of the bracket comprises an engaged portion engaged with the engaging portion,
   the cover is engaged with the frame.

2. The motor according to claim 1, wherein a terminal of an external device is connected to the first terminal via the opening.

3. The motor according to claim 1, further comprising:
   a second electronic component accommodated in the first portion of the bracket; and
   a second terminal disposed at the first portion of the bracket and connecting the first terminal and the second electronic component, wherein
   the second terminal comprises a protruding portion protruding toward the second electronic component, and
   a portion of the second electronic component at a side of the frame faces the protruding portion in an axial direction.

4. The motor according to claim 1, wherein
   an encoder is provided at an inner surface of the cover, and the side wall of the cover comprises the opening as a first opening, and a second opening facing a terminal of the encoder.

5. The motor according to claim 1, wherein the first electronic component reduces noise having a particular frequency.

6. The motor according to claim 1, wherein
the engaging portion of the cover is a protrusion protruding toward the side wall of the bracket,
the engaged portion of the bracket is a recess, and
the protrusion of the cover and the recess of the bracket engage with each other.

7. The motor according to claim 6, wherein
an outer circumferential surface of the protrusion of the cover has a recess, and a part of the frame at an opening side engages with the recess of the cover.

8. The motor according to claim 1, further comprising:
a rotation shaft;
a commutator contacting with the brush;
an armature core; and
a coil.

9. A motor, comprising:
a frame;
a bracket;
a bearing;
a shaft supported by the bracket via the bearing;
a brush;
a cover; and
a first electronic component, wherein
the bracket comprises a first portion accommodated in the frame, a second portion protruding from the first portion toward the cover and a side wall formed continuously from the first portion to the second portion,
the second portion is accommodated in the cover,
the brush is disposed at the first portion of the bracket, and
the first electronic component is disposed at the second portion of the bracket,
an encoder is provided at an inner surface of the cover, and
the side wall of the cover comprises an opening as a first opening, and a second opening facing a terminal of the encoder,
the cover is engaged with the frame.

10. The motor according to claim 9, wherein
an accommodating portion accommodating the first electronic component is formed at the second portion of the bracket,
a first terminal is disposed at the second portion of the bracket,
the opening is formed in a side wall of the cover facing the side wall of the bracket, the opening being open toward the first terminal, and
the first terminal and the first electronic component are arranged side by side in the bracket in a radial direction.

11. The motor according to claim 10, wherein a terminal of an external device is connected to the first terminal via the opening.

12. The motor according to claim 10, further comprising:
a second electronic component accommodated in the first portion of the bracket; and
a second terminal disposed at the first portion of the bracket and connecting the first terminal and the second electronic component, wherein
the second terminal comprises a protruding portion protruding toward the second electronic component, and
a portion of the second electronic component at a side of the frame faces the protruding portion in an axial direction.

13. The motor according to claim 9, wherein
the engaging portion of the cover is a protrusion protruding toward the side wall of the bracket,
the engaged portion of the bracket is a recess, and
the protrusion of the cover and the recess of the bracket engage with each other.

14. The motor according to claim 13, wherein
an outer circumferential surface of the protrusion of the cover has a recess, and a part of the frame at an opening side engages with the recess of the cover.

15. The motor according to claim 9, comprising:
a rotation shaft;
a commutator contacting with the brush;
an armature core; and
a coil.

* * * * *